United States Patent
Liu et al.

(10) Patent No.: US 10,659,297 B2
(45) Date of Patent: May 19, 2020

(54) NEGOTIATION MODE PROCESSING METHOD AND INTELLIGENT NETWORK DEVICE

(71) Applicant: Huawei Technologies Co., Ltd., Shenzhen (CN)

(72) Inventors: Fei Liu, Beijing (CN); Dapeng Chen, Beijing (CN); Jinli Du, Beijing (CN); Zhiqi Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 15/940,416

(22) Filed: Mar. 29, 2018

(65) Prior Publication Data

US 2018/0219732 A1 Aug. 2, 2018

Related U.S. Application Data

(63) Continuation of application No. PCT/CN2016/109750, filed on Dec. 13, 2016.

(30) Foreign Application Priority Data

Dec. 17, 2015 (CN) .......................... 2015 1 0952620

(51) Int. Cl.
H04L 12/24 (2006.01)
H04L 29/08 (2006.01)
H04L 12/917 (2013.01)

(52) U.S. Cl.
CPC ...... *H04L 41/0813* (2013.01); *H04L 41/0873* (2013.01); *H04L 41/0886* (2013.01); *H04L 69/323* (2013.01); *H04L 47/76* (2013.01)

(58) Field of Classification Search
CPC ... H04L 49/3054; H04L 41/083; H04B 10/40; G06F 1/3234; H04J 3/06
See application file for complete search history.

(56) References Cited

U.S. PATENT DOCUMENTS

2002/0039354 A1 4/2002 Chen et al.
2005/0129052 A1 6/2005 Hurwitz et al.
(Continued)

FOREIGN PATENT DOCUMENTS

CN 101350823 A 1/2009
CN 101360116 A 2/2009
(Continued)

OTHER PUBLICATIONS

Machine Translation of Chinese Publication No. CN101350823, Jan. 21, 2009, 20 pages.
(Continued)

*Primary Examiner* — Iqbal Zaidi
(74) *Attorney, Agent, or Firm* — Conley Rose, P.C.

(57) ABSTRACT

A negotiation mode processing method and an intelligent network device relate to the field of communications technologies, and used to improve application flexibility of the intelligent network device. The method includes determining, by an intelligent network device, that a physical layer (PHY) receives an auto-negotiation configuration stream from a network device connected to the PHY, and changing a negotiation mode of another PHY in the intelligent network device from a non-auto-negotiation mode to an auto-negotiation mode. The auto-negotiation configuration stream indicates that the device sending the auto-negotiation configuration stream is in the auto-negotiation mode. In this way, the application flexibility of the intelligent network device can be improved, and further improves communication quality of the network device.

19 Claims, 5 Drawing Sheets

(56) References Cited

U.S. PATENT DOCUMENTS

| | | | |
|---|---|---|---|
| 2007/0127920 A1 | 6/2007 | Ghiasi et al. | |
| 2011/0188519 A1 | 8/2011 | Yu | |
| 2013/0054725 A1* | 2/2013 | Chan | H04L 69/24 |
| | | | 709/209 |
| 2013/0170395 A1 | 7/2013 | Jeon | |
| 2013/0301449 A1* | 11/2013 | Maruhashi | H04L 41/0876 |
| | | | 370/252 |
| 2014/0071855 A1 | 3/2014 | Robitaille et al. | |
| 2016/0156478 A1* | 6/2016 | Zhao | H04L 12/12 |
| | | | 398/45 |

FOREIGN PATENT DOCUMENTS

| | | |
|---|---|---|
| CN | 103188338 A | 7/2013 |
| CN | 105591817 A | 5/2016 |
| EP | 1280302 A2 | 1/2003 |

OTHER PUBLICATIONS

Machine Translation of Chinese Publication No. CN105591817, May 18, 2016, 32 pages.
"IEEE Standard for Ethernet," IEEE Std 802.3™-2015, IEEE Computer Society, Sep. 2015, 628 pages.
"IEEE Standard for Ethernet, Section Two," IEE Std 8023, 2015, 761 pages.
"IEEE Standard for Ethernet, Section Three," IEE Std 8023, 2015, 346 pages.
"IEEE Standard for Ethernet, Section Four," IEE Std 802.3, 2015, 748 pages.
"IEEE Standard for Ethernet, Section Five," IEE Std 8023, 2015, 835 pages.
"IEEE Standard for Ethernet, Section Six," IEE Std 802.3, 2015, 699 pages.
Fioccola, G., Ed., et al, "Alternate Marking Method for Passive and Hybrid Performance Monitoring," draft-ieff-ippm-alt-mark-14, Dec. 7, 2017, 33 pages.
Bradner, S., et al: "Benchmarking Methodology for Network Interconnect Devices," RFC 2544, Mar. 1999, 25 pages.
Hiedayat, K., et al., "A Two-Way Active Measurement Protocol (TWAMP)," RFC 5357, Oct. 2008, 26 pages.
"Series Y: Global Information Infrastructure, Internet Protocol Aspects and Next-Generation Networks, Internet protocol aspects—Operation, administration and maintenance, OAM functions and mechanisms for Ethernet based networks," ITU-T Y.1731, May 2006, 81 pages.
Foreign Communication From a Counterpart Application, PCT Application No. PCT/CN2016/109750, English Translation of International Search Report dated Mar. 7, 2017, 2 pages.
Foreign Communication From a Counterpart Application, European Application No. 16874819.2, Extended European Search Report dated Apr. 30, 2018, 12 pages.

* cited by examiner

NEGOTIATION MODE PROCESSING METHOD AND INTELLIGENT NETWORK DEVICE

CROSS-REFERENCE TO RELATED APPLICATIONS

This application is a continuation of International Patent Application No. PCT/CN2016/109750 filed on Dec. 13, 2016, which claims priority to Chinese Patent Application No. 201510952620.X filed on Dec. 17, 2015. The disclosures of the aforementioned applications are hereby incorporated by reference in their entireties.

TECHNICAL FIELD

The present application relates to the field of communications technologies, and in particular, to a negotiation mode processing method and an intelligent network device.

BACKGROUND

A negotiation mode of a device in a network may be configured as an auto-negotiation mode or a non-auto-negotiation mode. Auto-negotiation means that a device notifies, of a working manner in which the device operates, another device that communicates with the device and that is at a remote end of a link, and detects an operation working manner notified by the device at the remote end, that is, the devices at two ends of the link achieve the highest working level by means of information exchange and automatic configuration. Non-auto-negotiation means that a particular working manner is forcibly set for a device, and the device does not negotiate with a peer device.

Only when negotiation modes of devices at two ends of a link are kept consistent, statuses of ports of the devices at the two ends can be normal, that is, the ports can be up and can further normally receive and send a packet. If negotiation modes of the devices at the two ends of the link are inconsistent, a port of a device whose negotiation mode is a non-auto-negotiation mode is up, and a port of a device whose negotiation mode is an auto-negotiation mode is down.

A status of a port relates to a connection of a physical layer (PHY). Some intelligent network devices have respective PHYs in structure, and the PHY is used to receive, send, and parse a packet. When such an intelligent network device connects to a network, a negotiation mode configuration of the intelligent network device also needs to be kept consistent with that of a network device that connects to the network and that is connected to the intelligent network device.

For example, an atom meter (AM) as an intelligent network device replacing an optical module may be inserted into a service port of any device, for example, a base station, a router, or a switch, in an existing network, and is used to implement optical-to-electrical conversion, network performance detection, and the like. The AM has two PHYs in structure. One PHY is connected to a host device of the AM, and the other PHY is connected to a device that communicates with the host device and that is at a remote end of a link. Respective negotiation mode configurations of the two PHYs need to be kept consistent with a negotiation configuration of the network device. Only in this way, it can be ensured that all ports are up in order to normally receive and send a packet.

The AM is an independent network device, and cannot sense a negotiation mode configuration of a network device connected to the AM. Usually, the negotiation mode of the AM is constant, and the AM is deployed on a network device having the same negotiation mode as that of the AM. When the negotiation mode of the network device connected to the AM is changed from a non-auto-negotiation mode to an auto-negotiation mode, a port of the network device connected to the AM is down. For such a case, in other approaches, in some solutions, a special-purpose tool is used to change the negotiation mode of the AM when the AM is offline, and then the AM connects to a network. However, in this way, not only normal communication of the network device is severely affected, but also application flexibility of the intelligent network device AM is affected.

SUMMARY

Embodiments of the present application provide a negotiation mode processing method and an intelligent network device to resolve problems that an existing intelligent network device such as an AM cannot sense a negotiation mode configuration of a network device, and consequently, when a negotiation mode of the network device is changed from a non-auto-negotiation mode to an auto-negotiation mode, a port of the device is down, application of the intelligent network device is inflexible, and normal communication of the network device is affected.

Specific technical solutions provided in the embodiments of the present application are as follows.

According to a first aspect, a negotiation mode processing method is provided, including determining, by an intelligent network device, that a first PHY receives a first auto-negotiation configuration stream sent by a first network device connected to the first PHY, where the first auto-negotiation configuration stream is used to indicate that a negotiation mode of the first network device sending the first auto-negotiation configuration stream is an auto-negotiation mode, changing, by the intelligent network device, a negotiation mode of a second PHY from a non-auto-negotiation mode to the auto-negotiation mode according to the first auto-negotiation configuration stream received by the first PHY, and sending, by the intelligent network device, a second auto-negotiation configuration stream to a second network device connected to the second PHY after determining that the negotiation mode of the second PHY is changed to the auto-negotiation mode, and changing a negotiation mode of the first PHY from the non-auto-negotiation mode to the auto-negotiation mode when receiving a third auto-negotiation configuration stream fed back by the second network device, where the first PHY and the second PHY are located in the intelligent network device.

With reference to the first aspect, in a first possible implementation of the first aspect, the intelligent network device is plug-connected to the first network device to implement connection between the first PHY and the first network device, and the intelligent network device is connected to the second network device in a remote communications connection manner to implement connection between the second PHY and the second network device.

With reference to the first aspect, in a second possible implementation of the first aspect, the intelligent network device is plug-connected to the first network device to implement connection between the first PHY and the first network device. The intelligent network device is connected to the second network device using another intelligent network device to implement connection between the second PHY and the second network device, sending, by the intelligent network device, a second auto-negotiation configuration stream to a second network device connected to the second PHY includes sending, by the intelligent network device, the second auto-negotiation configuration stream to the second network device using the other intelligent network device, and receiving, by the intelligent network device, a third auto-negotiation configuration stream fed back by the second network device includes receiving, by the intelligent network device using the other intelligent network device, the third auto-negotiation configuration stream fed back by the second network device.

With reference to the second possible implementation of the first aspect, in a third possible implementation of the first aspect, sending, by the intelligent network device, the second auto-negotiation configuration stream to the second network device using the other intelligent network device includes sending, by the intelligent network device, a fourth auto-negotiation configuration stream to a third PHY in the other intelligent network device, and after the other intelligent network device changes a negotiation mode of a fourth PHY in the other intelligent network device to the auto-negotiation mode, sending a fifth auto-negotiation configuration stream to the second network device using the fourth PHY, and receiving, by the intelligent network device using the other intelligent network device, the third auto-negotiation configuration stream fed back by the second network device includes receiving, by the intelligent network device, a sixth auto-negotiation configuration stream fed back by the third PHY in the other intelligent network device, where the sixth auto-negotiation configuration stream is fed back by the third PHY to the intelligent network device after the other intelligent network device receives, at the fourth PHY, a seventh auto-negotiation configuration stream fed back by the second network device, and changes a negotiation mode of the third PHY to the auto-negotiation mode.

With reference to any one of the first aspect, or the first to the third possible implementations of the first aspect, in a fourth possible implementation of the first aspect, the method further includes controlling, by the intelligent network device, the second PHY to send an abnormal stream to the second network device when a fault occurs between the first PHY and the first network device, where the abnormal stream is used to indicate that the fault occurs between the first PHY and the first network device.

With reference to any one of the first aspect, or the first to the fourth possible implementations of the first aspect, in a fifth possible implementation of the first aspect, after changing the negotiation mode of the first PHY from the non-auto-negotiation mode to the auto-negotiation mode, the intelligent network device sends an eighth auto-negotiation configuration stream to the first network device.

According to a second aspect, an intelligent network device is provided, including a determining unit configured to determine that a first PHY receives a first auto-negotiation configuration stream sent by a first network device connected to the first PHY, where the first auto-negotiation configuration stream is used to indicate that a negotiation mode of the first network device sending the first auto-negotiation configuration stream is an auto-negotiation mode, a configuration unit configured to change a negotiation mode of a second PHY from a non-auto-negotiation mode to the auto-negotiation mode according to the first auto-negotiation configuration stream that is determined by the determining unit and that is received by the first PHY, where the determining unit is further configured to send a second auto-negotiation configuration stream to a second network device connected to the second PHY, and receive a third auto-negotiation configuration stream fed back by the second network device after determining that the negotiation mode of the second PHY is changed to the auto-negotiation mode. The configuration unit is further configured to change a negotiation mode of the first PHY from the non-auto-negotiation mode to the auto-negotiation mode after the determining unit determines that the third auto-negotiation configuration stream fed back by the second network device is received, and the first PHY and the second PHY are located in the intelligent network device.

With reference to the second aspect, in a first possible implementation of the second aspect, the intelligent network device is plug-connected to the first network device to implement connection between the first PHY and the first network device, and the intelligent network device is connected to the second network device in a remote communications connection manner to implement connection between the second PHY and the second network device.

With reference to the second aspect, in a second possible implementation of the second aspect, the intelligent network device is plug-connected to the first network device to implement connection between the first PHY and the first network device. The intelligent network device is connected to the second network device using another intelligent network device to implement connection between the second PHY and the second network device, and when sending, after determining that the negotiation mode of the second PHY is changed to the auto-negotiation mode, the second auto-negotiation configuration stream to the second network device connected to the second PHY, and receiving the third auto-negotiation configuration stream fed back by the second network device, the determining unit is further configured to send, using the other intelligent network device, the second auto-negotiation configuration stream to the second network device connected to the second PHY, and receive the third auto-negotiation configuration stream that is fed back by the second network device using the other intelligent network device after determining that the negotiation mode of the second PHY is changed to the auto-negotiation mode.

With reference to the second possible implementation of the second aspect, in a third possible implementation of the second aspect, sending, by the intelligent network device, the second auto-negotiation configuration stream to the second network device using the other intelligent network device includes sending, by the intelligent network device, a fourth auto-negotiation configuration stream to a third PHY in the other intelligent network device, and sending a fifth auto-negotiation configuration stream to the second network device using the fourth PHY after the other intelligent network device changes a negotiation mode of a fourth PHY in the other intelligent network device to the auto-negotiation mode, and receiving, by the intelligent network device using the other intelligent network device, the third auto-negotiation configuration stream fed back by the second network device includes receiving, by the intelligent network device, a sixth auto-negotiation configuration stream fed back by the third PHY in the other intelligent network device, where the sixth auto-negotiation configuration stream is fed back by the third PHY to the intelligent network device after the other intelligent network device receives, at the fourth PHY, a seventh auto-negotiation configuration stream fed back by the second network device, and changes a negotiation mode of the third PHY to the auto-negotiation mode.

With reference to any one of the second aspect, or the first to the third possible implementations of the second aspect, in a fourth possible implementation of the second aspect, the intelligent network device further includes a control unit configured to control the second PHY to send an abnormal stream to the second network device when the determining unit determines that a fault occurs between the first PHY and the first network device, where the abnormal stream is used to indicate that the fault occurs between the first PHY and the first network device.

With reference to any one of the second aspect, or the first to the fourth possible implementations of the second aspect, in a fifth possible implementation of the second aspect, the intelligent network device further includes a sending unit configured to send an eighth auto-negotiation configuration stream to the first network device after the configuration unit changes the negotiation mode of the first PHY from the non-auto-negotiation mode to the auto-negotiation mode.

According to a third aspect, an intelligent network device is provided, including a transceiver, a processor, and a bus, where the transceiver and the processor are both connected to the bus, and the processor is configured to determine that a first PHY receives a first auto-negotiation configuration stream sent by a first network device connected to the first PHY, where the first auto-negotiation configuration stream is used to indicate that a negotiation mode of the first network device sending the first auto-negotiation configuration stream is an auto-negotiation mode, change a negotiation mode of a second PHY from a non-auto-negotiation mode to the auto-negotiation mode according to the first auto-negotiation configuration stream received by the first PHY, and send a second auto-negotiation configuration stream to a second network device connected to the second PHY after determining that the negotiation mode of the second PHY is changed to the auto-negotiation mode, and change a negotiation mode of the first PHY from the non-auto-negotiation mode to the auto-negotiation mode when receiving a third auto-negotiation configuration stream fed back by the second network device, where the first PHY and the second PHY are located in the intelligent network device.

With reference to the third aspect, in a first possible implementation of the third aspect, the intelligent network device is plug-connected to the first network device to implement connection between the first PHY and the first network device, and the intelligent network device is connected to the second network device in a remote communications connection manner to implement connection between the second PHY and the second network device.

With reference to the third aspect, in a second possible implementation of the third aspect, the intelligent network device is plug-connected to the first network device to implement connection between the first PHY and the first network device. The intelligent network device is connected to the second network device using another intelligent network device to implement connection between the second PHY and the second network device, and the processor is further configured to send, using the other intelligent network device, the second auto-negotiation configuration stream to the second network device connected to the second PHY, and receive the third auto-negotiation configuration stream that is fed back by the second network device using the other intelligent network device after the negotiation mode of the second PHY is changed to the auto-negotiation mode.

With reference to the second possible implementation of the third aspect, in a third possible implementation of the third aspect, when sending the second auto-negotiation configuration stream to the second network device using the other intelligent network device, the processor is further configured to send a fourth auto-negotiation configuration stream to a third PHY in the other intelligent network device, and send a fifth auto-negotiation configuration stream to the second network device using the fourth PHY after the other intelligent network device changes a negotiation mode of a fourth PHY in the other intelligent network device to the auto-negotiation mode, and when receiving, using the other intelligent network device, the third auto-negotiation configuration stream fed back by the second network device, the processor is further configured to receive a sixth auto-negotiation configuration stream fed back by the third PHY in the other intelligent network device, where the sixth auto-negotiation configuration stream is fed back by the third PHY to the intelligent network device after the other intelligent network device receives, at the fourth PHY, a seventh auto-negotiation configuration stream fed back by the second network device, and changes a negotiation mode of the third PHY to the auto-negotiation mode.

With reference to any one of the third aspect, or the first to the third possible implementations of the third aspect, in a fourth possible implementation of the third aspect, the processor is further configured to control the second PHY to send an abnormal stream to the second network device when a fault occurs between the first PHY and the first network device, where the abnormal stream is used to indicate that the fault occurs between the first PHY and the first network device.

With reference to any one of the third aspect, or the first to the fourth possible implementations of the third aspect, in a fifth possible implementation of the third aspect, the intelligent network device further includes a memory configured to store a program invoked by the processor.

With reference to any one of the third aspect, or the first to the fifth possible implementations of the third aspect, in a sixth possible implementation of the third aspect, the processor is further configured to send an eighth auto-negotiation configuration stream to the first network device after changing the negotiation mode of the first PHY from the non-auto-negotiation mode to the auto-negotiation mode.

In this application, the intelligent network device determines that a PHY receives a first auto-negotiation configuration stream sent by a network device connected to the PHY, and changes a negotiation mode of another PHY in the intelligent network device from the non-auto-negotiation mode to the auto-negotiation mode. The first auto-negotiation configuration stream is used to indicate that the network device sending the first auto-negotiation configuration stream is in the auto-negotiation mode. In this way, when a negotiation mode of a network device connected to the intelligent network device is changed from the non-auto-negotiation mode to the auto-negotiation mode, the change of the negotiation mode can be transmitted to a network device at another end using the foregoing method, and the intelligent network device can be adaptive to the change of the negotiation mode of the network device, ensuring that negotiation modes of ports at various ends are consistent such that the ports at the various ends are up, thereby improving application flexibility of the intelligent network device, and further improving communication quality of the network device.

DESCRIPTION OF EMBODIMENTS

Figure 1:
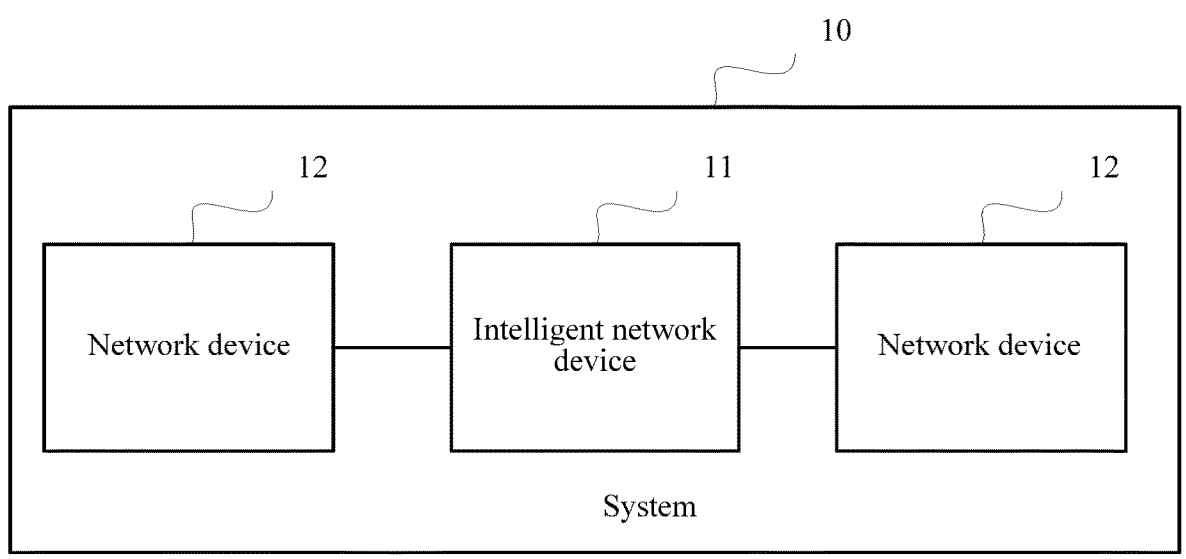
FIG. 1 is an architectural diagram of a system according to this application.

To make the objectives, technical solutions, and advantages of this application clearer, the following further describes this application in detail with reference to the accompanying drawings. The described embodiments are merely a part rather than all of the embodiments of this application. All other embodiments obtained by a person of ordinary skill in the art based on the embodiments of this application without creative efforts shall fall within the protection scope of this application.

An intelligent network device used in this application is any intelligent network device having two PHYs. The concept of the PHYs described in this application may be equivalent to physical transceivers having physical interfaces. The PHYs in the intelligent network device may be used to implement functions such as receiving and sending a packet, and parsing a packet. When such an intelligent network device connects to a network, a problem of matching with a negotiation mode of a network device connected to the intelligent network device exists.

The inventive idea of this application is mainly that for any intelligent network device having two PHYs, each PHY is connected to a network device, and when one of the PHYs senses information about a network change brought by a network device connected to the PHY, processing is performed for the other PHY. The processing is used to transmit the information about the network change to a network device connected to the other PHY.

In view of the problem that an existing intelligent network device cannot sense a change of a negotiation mode of a network device connected to the intelligent network device, this application provides a negotiation mode processing method and an intelligent network device. When a negotiation mode of one of network devices that are connected to the intelligent network device is changed from a non-auto-negotiation mode to an auto-negotiation mode, the intelligent network device notifies, of the change, another network device connected to the intelligent network device using a leap transmission method. Leap transmission is that when a PHY in the intelligent network device receives an auto-negotiation configuration stream, a negotiation mode of another PHY is changed to an auto-negotiation mode.

This application is preferably applied to the 1000 BASE-X Protocol. In the 1000 BASE-X Protocol, in an 8-bit data to a 10-bit transmission character (8 B/10 B) encoding type at a PHY, an auto-negotiation configuration stream is a /C/ code. If two ends are both in the auto-negotiation mode, the two ends send an auto-negotiation configuration stream to each other, that is, send /C/ codes to each other. For a first end, the first end is any end. If receiving three consecutive consistent /C/ codes, the first end sends /C/ codes carrying acknowledgements (ACKs) to the other end. The other end performs matching between three received consecutive /C/ codes that carry ACKs and three previously received /C/ codes that do not carry any ACK. If the matching succeeds, a port is set to being up.

A structure of a system 10 to which this application is applied is shown in FIG. 1. The system 10 includes an intelligent network device 11 and two network devices 12 connected to the intelligent network device 11. The intelligent network device 11 has two PHYs that are respectively connected to the two network devices 12. One of the network devices 12 is a host device of the intelligent network device 11. The host device is connected to one of the PHYs in the intelligent network device 11. The other network device 12 is a remote device communicating with the host device. The remote device is connected to the other PHY in the intelligent network device 11. For example, the network devices 12 may be base stations, routers, switches, and the like.

A negotiation mode processing method and an intelligent network device that are provided in this application are described in detail below with reference to the accompanying drawings.

Figure 2:
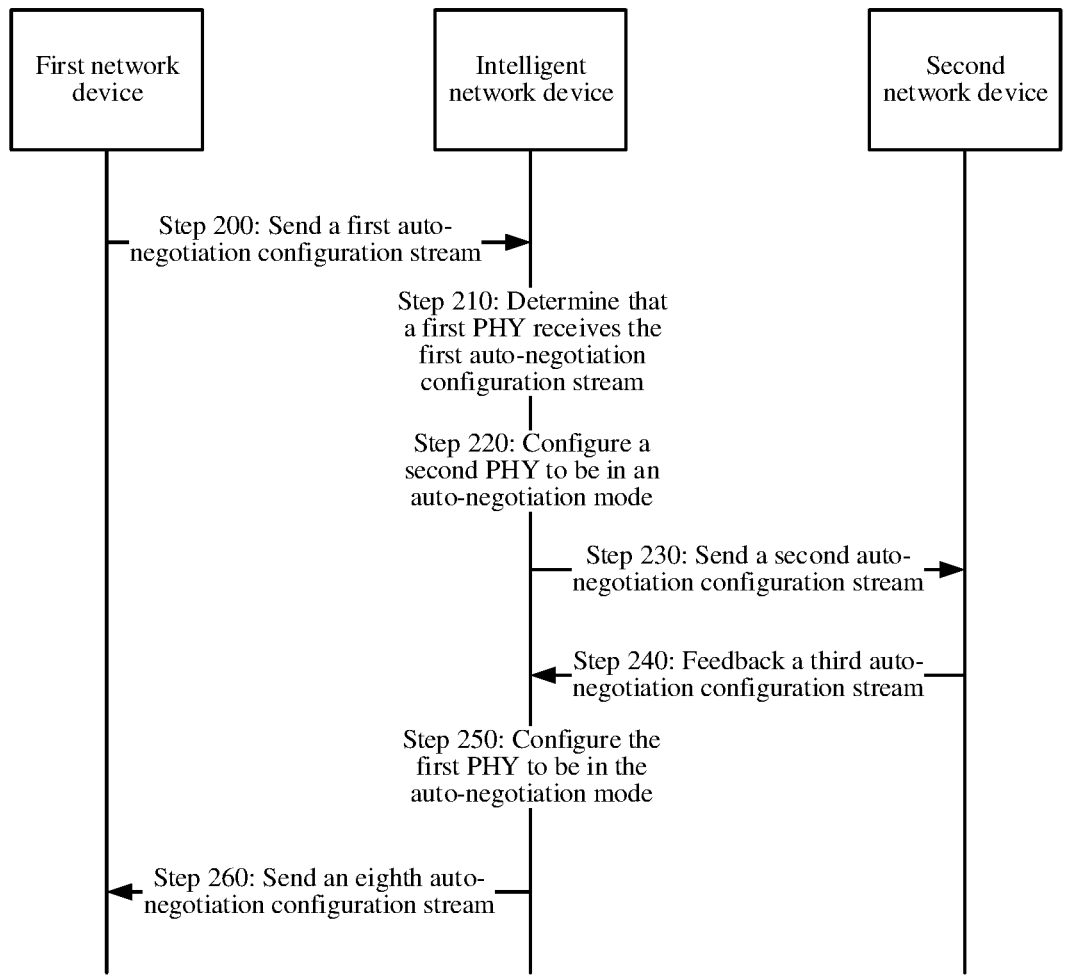
FIG. 2 is a flowchart of a negotiation mode processing method according to this application.

Referring to FIG. 2, a procedure of the negotiation mode processing method provided in this application is as follows.

For ease of description, two PHYs of the intelligent network device are respectively referred to as a first PHY and a second PHY, a network device connected to the first PHY is referred to as a first network device, and a network device connected to the second PHY is referred to as a second network device.

The intelligent network device is plug-connected to the first network device to implement connection between the first PHY and the first network device. That is, the first PHY is directly connected to the first network device. The first network device is a host device of the intelligent network device.

The intelligent network device is connected to the second network device in a remote communications connection manner to implement connection between the second PHY and the second network device. That is, the second PHY is coupled to the second network device. For example, the intelligent network device is connected to the second network device using an optical fiber.

Alternatively, the intelligent network device is connected to the second network device using another intelligent network device to implement connection between the second PHY and the second network device. Such a case may also be understood as that the second PHY is connected to the second network device in an indirect manner. The other intelligent network device also has two PHYs. It is assumed that the two PHYs are respectively a third PHY and a fourth PHY. Certainly, initial states of negotiation modes of the third PHY and the fourth PHY are also a non-auto-negotiation mode. The two intelligent network devices are connected to each other in a remote communication manner. For example, the second PHY is connected to the third PHY using an optical fiber. The other intelligent network device is plug-connected to the second network device such that the fourth PHY is connected to the second network device, and further, the second PHY is connected to the second network device.

In this application, initial states of negotiation modes of the two PHYs of the intelligent network device are both set to the non-auto-negotiation mode.

For ease of description, auto-negotiation configuration streams described in the following content of this application are distinguished using first, second, and the like, but forms, content, functions, and the like of the auto-negotiation configuration streams are the same. For example, the auto-negotiation configuration streams are /C/ codes.

Step 200: The first network device sends a first auto-negotiation configuration stream to the intelligent network device.

If an initial state of a negotiation mode of the first network device is an auto-negotiation mode, when the intelligent network device connects to a network, the first network device sends the first auto-negotiation configuration stream to the intelligent network device.

If the initial state of the negotiation mode of the first network device is the non-auto-negotiation mode, when the negotiation mode of the first network device is changed from the non-auto-negotiation mode to the auto-negotiation mode, the first network device also sends the first auto-negotiation configuration stream to the intelligent network device.

That the first network device sends the first auto-negotiation configuration stream to the intelligent network device is that the first network device sends the first auto-negotiation configuration stream to the first PHY that is in the intelligent network device and that is connected to the first network device. The first auto-negotiation configuration stream is used to indicate that the negotiation mode of the first network device sending the first auto-negotiation configuration stream is the auto-negotiation mode.

Step 210: The intelligent network device determines that the first PHY receives the first auto-negotiation configuration stream sent by the first network device connected to the first PHY.

After receiving the first auto-negotiation configuration stream sent by the first network device, the intelligent network device determines that the negotiation mode of the first network device is already the auto-negotiation mode.

Step 220: The intelligent network device changes a negotiation mode of the second PHY from the non-auto-negotiation mode to the auto-negotiation mode according to the first auto-negotiation configuration stream received by the first PHY.

Step 230: The second PHY in the intelligent network device sends a second auto-negotiation configuration stream to the second network device.

The second PHY is changed from the non-auto-negotiation mode to the auto-negotiation mode. Therefore, the second PHY automatically sends the second auto-negotiation configuration stream to the second network device connected to the second PHY.

An implementation in which the second PHY sends the second auto-negotiation configuration stream to the second network device connected to the second PHY may include two cases.

If the intelligent network device is connected to the second network device in a remote communications connection manner, to implement connection between the second PHY and the second network device, the second PHY directly sends the second auto-negotiation configuration stream to the second network device using a communications link (for example, an optical fiber).

If the intelligent network device is connected to the second network device using the other intelligent network device, to implement connection between the second PHY and the second network device, the second PHY sends the second auto-negotiation configuration stream to the second network device using the other intelligent network device. A specific process may be described as the second PHY sends a fourth auto-negotiation configuration stream to the third PHY in the other intelligent network device using a communications link (for example, an optical fiber), after the third PHY receives the fourth auto-negotiation configuration stream, the other intelligent network device configures the fourth PHY to be in the auto-negotiation mode, and the fourth PHY sends a fifth auto-negotiation configuration stream to the second network device.

Step 240: When the negotiation mode of the second network device is the auto-negotiation mode, the second network device feeds back a third auto-negotiation configuration stream to the second PHY.

If the negotiation mode of the second network device is the auto-negotiation mode, the second network device automatically feeds back an auto-negotiation configuration stream after the second network device receives an auto-negotiation configuration stream. The fed back auto-negotiation configuration stream herein is referred to as the third auto-negotiation configuration stream.

Similarly, that the second network device feeds back the third auto-negotiation configuration stream to the second PHY also includes two cases.

If the intelligent network device is connected to the second network device in a remote communications connection manner, to implement connection between the second PHY and the second network device, the second network device directly feeds back, using a communications link (for example, an optical fiber), the third auto-negotiation configuration stream to the second PHY after the second network device receives the second auto-negotiation configuration stream sent by the second PHY.

If the intelligent network device is connected to the second network device using the other intelligent network device, to implement connection between the second PHY and the second network device, as described in step 230, the second PHY sends the second auto-negotiation configuration stream to the second network device using the other intelligent network device. The second network device receives the fifth auto-negotiation configuration stream sent by the fourth PHY in the other intelligent network device. After receiving the fifth auto-negotiation configuration stream, the second network device feeds back a sixth auto-negotiation configuration stream to the fourth PHY using a communications link (for example, an optical fiber). After the fourth PHY receives the sixth auto-negotiation configuration stream fed back by the second network device, the other intelligent network device changes a negotiation mode of the third PHY to the auto-negotiation mode, and feeds back a seventh auto-negotiation configuration stream to the second PHY in the intelligent network device using the third PHY.

Step 250: When the second PHY receives the third auto-negotiation configuration stream fed back by the second network device, the intelligent network device changes a negotiation mode of the first PHY from the non-auto-negotiation mode to the auto-negotiation mode.

Further, after the negotiation mode of the second PHY is changed to the auto-negotiation mode, the intelligent network device sends the second auto-negotiation configuration stream to the second network device connected to the second PHY, and when receiving the third auto-negotiation configuration stream fed back by the second network device, changes the negotiation mode of the first PHY from the non-auto-negotiation mode to the auto-negotiation mode.

As described in step 250, the intelligent network device directly receives the third auto-negotiation configuration stream fed back by the second network device according to a connection manner between the second PHY and the second network device, or the intelligent network device receives, using the other intelligent network device, the third auto-negotiation configuration stream fed back by the second network device.

That the intelligent network device receives, using the other intelligent network device, the third auto-negotiation configuration stream fed back by the second network device includes receiving, by the intelligent network device, the sixth auto-negotiation configuration stream fed back by the third PHY in the other intelligent network device, where the sixth auto-negotiation configuration stream is fed back by the third PHY to the intelligent network device after the other intelligent network device receives, at the fourth PHY, the seventh auto-negotiation configuration stream fed back by the second network device, and changes a negotiation mode of the third PHY to the auto-negotiation mode.

Step 260: The first PHY in the intelligent network device sends an eighth auto-negotiation configuration stream to the first network device.

By means of the foregoing method, in this application, when the intelligent network device is applied to a network, a negotiation mode of a device connected to the intelligent network device is changed from the non-auto-negotiation mode to the auto-negotiation mode. Information about the change can be transmitted to a device at another end, and communication of the devices in the network is not affected because of negotiation mode processing. In addition, by means of the method provided in this application, the intelligent network device can adaptively change the negotiation mode of the intelligent network device, to match a negotiation mode of a network device connected to the intelligent network device. The negotiation mode does not need to be changed using a special-purpose tool in an offline case, thereby improving application flexibility of the intelligent network device while ensuring normal communication of the devices in the network.

In the other approaches, when the intelligent network device is applied to the network, when a fault occurs between the intelligent network device and any network device connected to the intelligent network device, another network device cannot sense the fault.

In view of this, in this application, when a fault occurs between the first PHY and the first network device, the intelligent network device controls the second PHY to send an abnormal stream to the second network device, where the abnormal stream is used to indicate that the fault occurs between the first PHY and the first network device. The fault includes at least any one of a device fault of the first network device, a link fault between the intelligent network device and the first network device, or an interface fault of the first PHY in the intelligent network device. When a port of the first PHY is down, the intelligent network device determines that a fault occurs between the first PHY and the first network device.

In this way, the second network device receives the abnormal stream, and the fault between the first PHY and the first network device is transmitted to the second network device. A port of the second network device is down.

On the contrary, when a fault occurs between the second PHY and the second network device, the intelligent network device controls the first PHY to send an abnormal stream to the first network device. The first network device receives the abnormal stream, and the fault between the second PHY and the second network device is transmitted to the first network device. A port of the first network device is down.

In addition, in this application, a fault may be notified by resetting a PHY. When the second PHY is controlled to reset the PHY, a port of the second network device is also down.

If the second PHY is connected to the second network device using the other intelligent network device, when a fault occurs between the first network device and the first PHY, the intelligent network device controls the second PHY to send an abnormal stream to the third PHY such that the other intelligent network device senses the fault, and takes measures to control the fourth PHY to send an abnormal stream to the second network device. In this way, the fault between the first PHY and the first network device is transmitted to the second network device in an indirect manner. The port of the second network device is down.

By means of the foregoing method in this application, when a fault occurs between a PHY and a peer, the intelligent network device may transmit the fault to a network device connected to another PHY.

By means of the negotiation mode processing method provided in this application, when there is an intelligent network device between network devices at two ends of a communications link, it may be ensured that when a negotiation mode of the network device at one end is changed or a fault occurs between the network device at one end and the intelligent network device, the network device at the other end can sense the foregoing network change occurring in the network device at the one end. Therefore, a sensing capability of the network device at the other end is kept the same when there is no intelligent network device between the network devices at the two ends.

An example in which the intelligent network device is an AM is used below in this application. The negotiation mode processing method provided in this application is further described in detail with reference to the accompanying drawings.

Figure 3A:
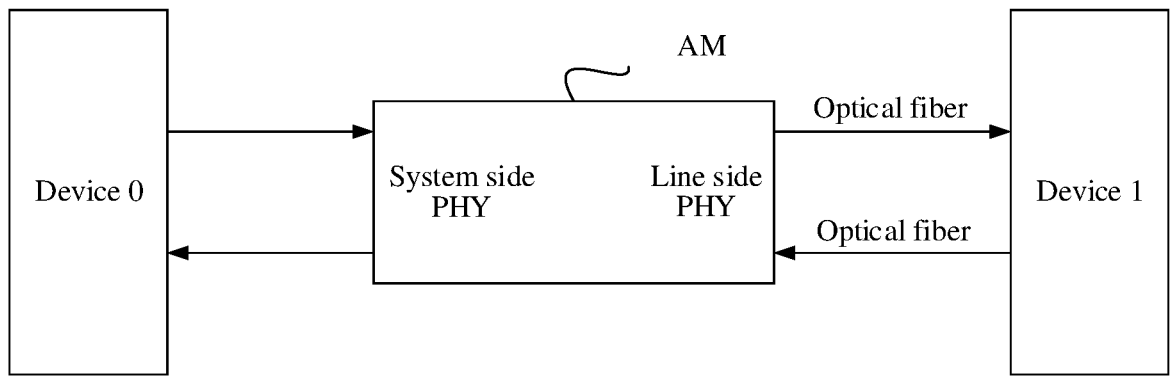
FIG. 3A is a schematic diagram of a first connection manner according to this application.

A first connection manner is shown in FIG. 3A, an AM is plug-connected to a device 0, and the device 0 communicates with a device 1. Two PHYs of the AM are respectively a system side PHY and a line side PHY. The system side PHY is an electrical connection interface side PHY of the AM, and is connected to the device 0. The line side PHY is a PHY on a side from which optical fibers come out, and is connected to the device 1 using optical fibers. Initial states of negotiation modes of the system side PHY and the line side PHY of the AM are both a non-auto-negotiation mode.

Figure 3B:
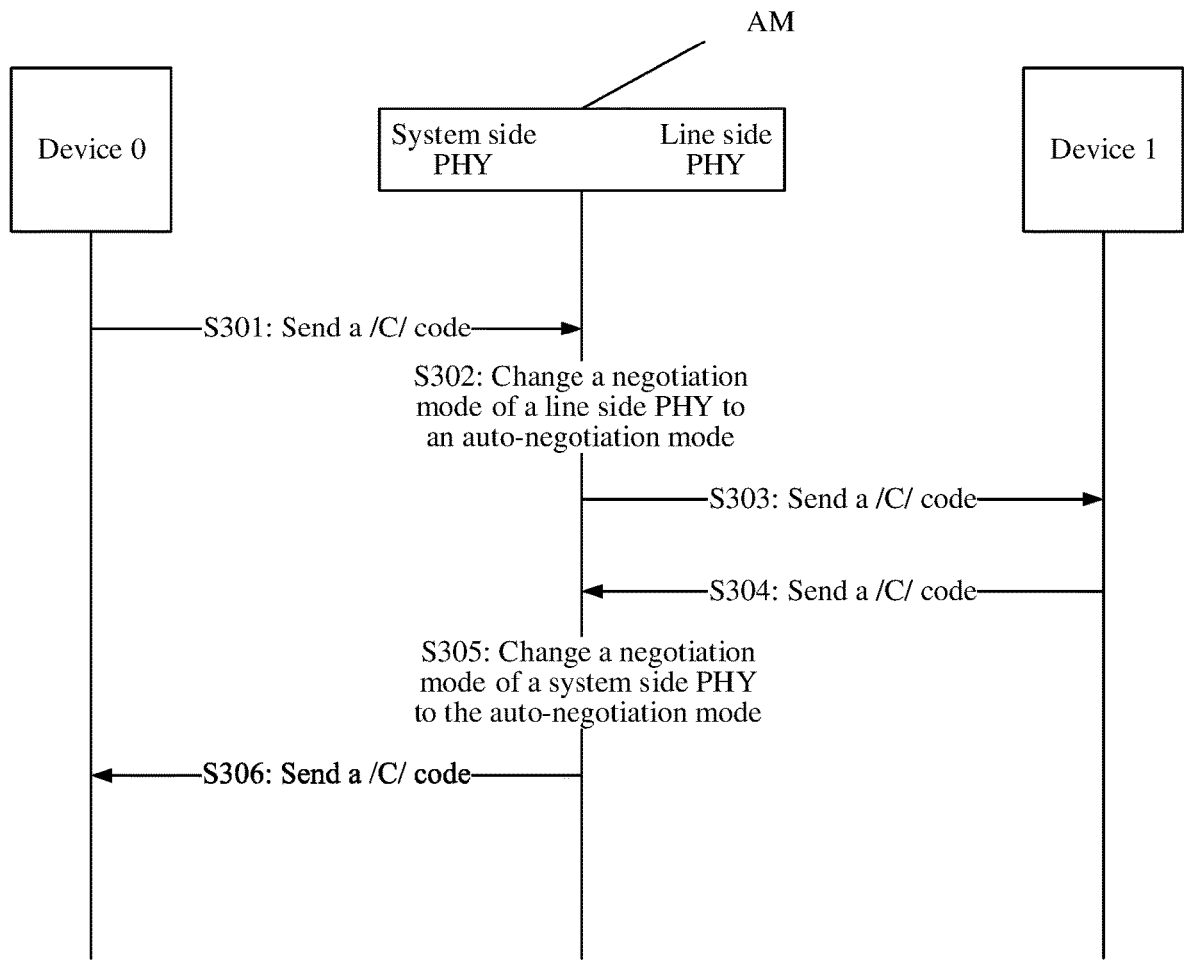
FIG. 3B is a schematic diagram of a transmission procedure of a negotiation mode in a first connection manner according to this application.

Referring to FIG. 3B, FIG. 3B is a schematic diagram of a transmission procedure of a negotiation mode in a first connection manner.

Step S301: A device 0 sends a /C/ code to a system side PHY.

An initial state of a negotiation mode of the device 0 is an auto-negotiation mode. When an AM is plug-connected to the device 0, the device 0 sends an auto-negotiation configuration stream to the system side PHY. The auto-negotiation configuration stream is a /C/ code.

Alternatively, an initial state of a negotiation mode of the device 0 is a non-auto-negotiation mode, and a negotiation mode of the AM is also the non-auto-negotiation mode. Therefore, ports at two ends are up. However, when the negotiation mode of the device 0 is changed to the auto-negotiation mode, the device 0 sends the /C/ code to the system side PHY.

Step S302: After the system side PHY receives the /C/ code, the AM changes a negotiation mode of a line side PHY to the auto-negotiation mode.

Step S303: After the negotiation mode of the line side PHY is changed to the auto-negotiation mode, the line side PHY automatically sends a /C/ code to a device 1.

Step S304: The device 1 feeds back a /C/ code to the line side PHY.

Step S305: The AM changes a negotiation mode of the system side PHY to the auto-negotiation mode.

Step S306: After the negotiation mode of the system side PHY is changed to the auto-negotiation mode, the system side PHY automatically sends a /C/ code to the device 0.

By means of the foregoing process, the negotiation modes of the AM, the device 0, and the device 1 are consistent.

Figure 4A:
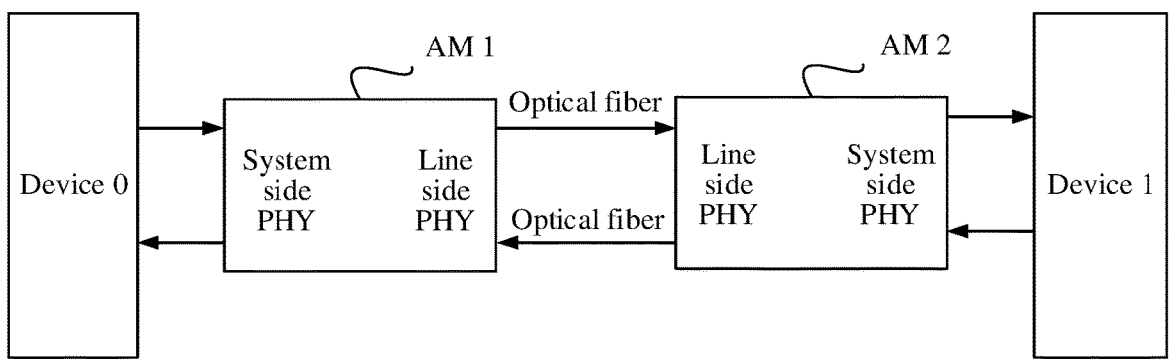
FIG. 4A is a schematic diagram of a second connection manner according to this application.

A second connection manner is shown in FIG. 4A, an AM 1 is plug-connected to a device 0, an AM 2 is plug-connected to a device 1, and the device 0 communicates with the device 1. Two PHYs of each of the AM 1 and the AM 2 are respectively a system side PHY and a line side PHY. The system side PHY is an electrical connection interface side PHY. The system side PHY of the AM 1 is connected to the device 0, and the system side PHY of the AM 2 is connected to the device 1. The line side PHY is a PHY on a side from which optical fibers come out, and two line side PHYs are connected using optical fibers. Initial states of negotiation modes of the system side PHYs and the line side PHYs of both the AM 1 and the AM 2 are a non-auto-negotiation mode.

Figure 4B:
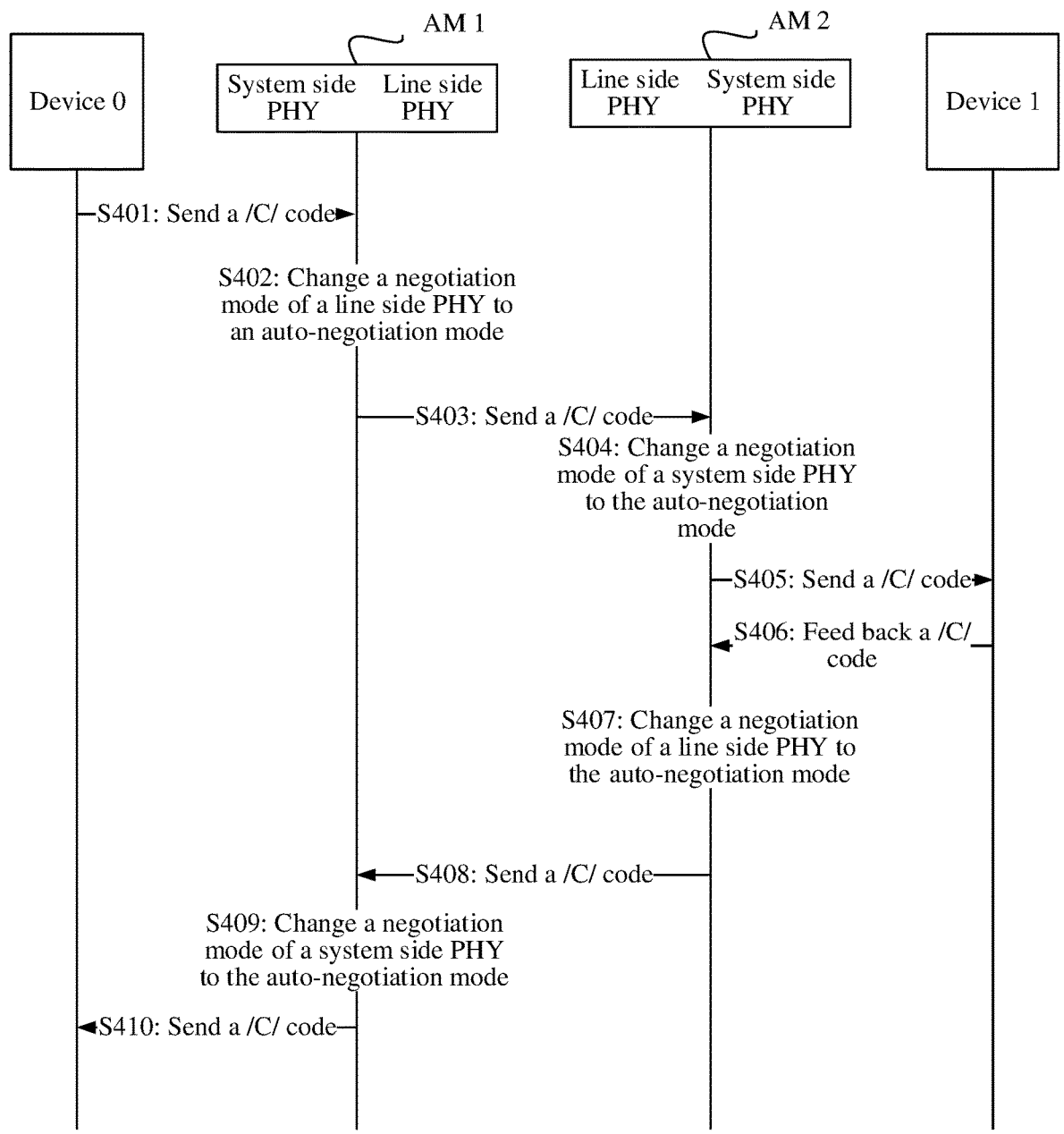
FIG. 4B is a schematic diagram of a transmission procedure of a negotiation mode in a second connection manner according to this application.

Referring to FIG. 4B, FIG. 4B is a schematic diagram of a transmission procedure of a negotiation mode in a second connection manner.

Step S401: A device 0 sends a /C/ code to a system side PHY of an AM 1.

An initial state of a negotiation mode of the device 0 is an auto-negotiation mode. When the AM 1 is plug-connected to the device 0, the device 0 sends the /C/ code to the system side PHY of the AM 1.

Alternatively, an initial state of a negotiation mode of the device 0 is a non-auto-negotiation mode, and a negotiation mode of the AM 1 is also the non-auto-negotiation mode. Therefore, ports at two ends are up. However, when the negotiation mode of the device 0 is changed to the auto-negotiation mode, the device 0 sends the /C/ code to the system side PHY of the AM 1.

Step S402: After the system side PHY of the AM 1 receives the /C/ code, the AM 1 changes a negotiation mode of a line side PHY to the auto-negotiation mode.

Step S403: After the negotiation mode of the line side PHY of the AM 1 is changed to the auto-negotiation mode, the line side PHY automatically sends a /C/ code to a line side PHY of an AM 2.

Step S404: After the line side PHY of the AM 2 receives the /C/ code, the AM 2 changes a negotiation mode of the system side PHY to the auto-negotiation mode.

Step S405: After the negotiation mode of the system side PHY of the AM 2 is changed to the auto-negotiation mode, the system side PHY automatically sends a /C/ code to a device 1.

Step S406: The device 1 feeds back a /C/ code to the system side PHY of the AM 2.

Step S407: After the system side PHY of the AM 2 receives the /C/ code, the AM 2 changes the negotiation mode of the line side PHY to the auto-negotiation mode.

Step S408: After the negotiation mode of the line side PHY of the AM 2 is changed to the auto-negotiation mode, the line side PHY automatically sends a /C/ code to the line side PHY of the AM 1.

Step S409: After the line side PHY of the AM 1 receives the /C/ code, the AM 1 changes the negotiation mode of the system side PHY to the auto-negotiation mode.

Step S410: After the negotiation mode of the system side PHY of the AM 1 is changed to the auto-negotiation mode, the system side PHY automatically sends a /C/ code to the device 0.

By means of the foregoing process, the negotiation modes of the AM 1, the AM 2, the device 0, and the device 1 are consistent.

Figure 5:
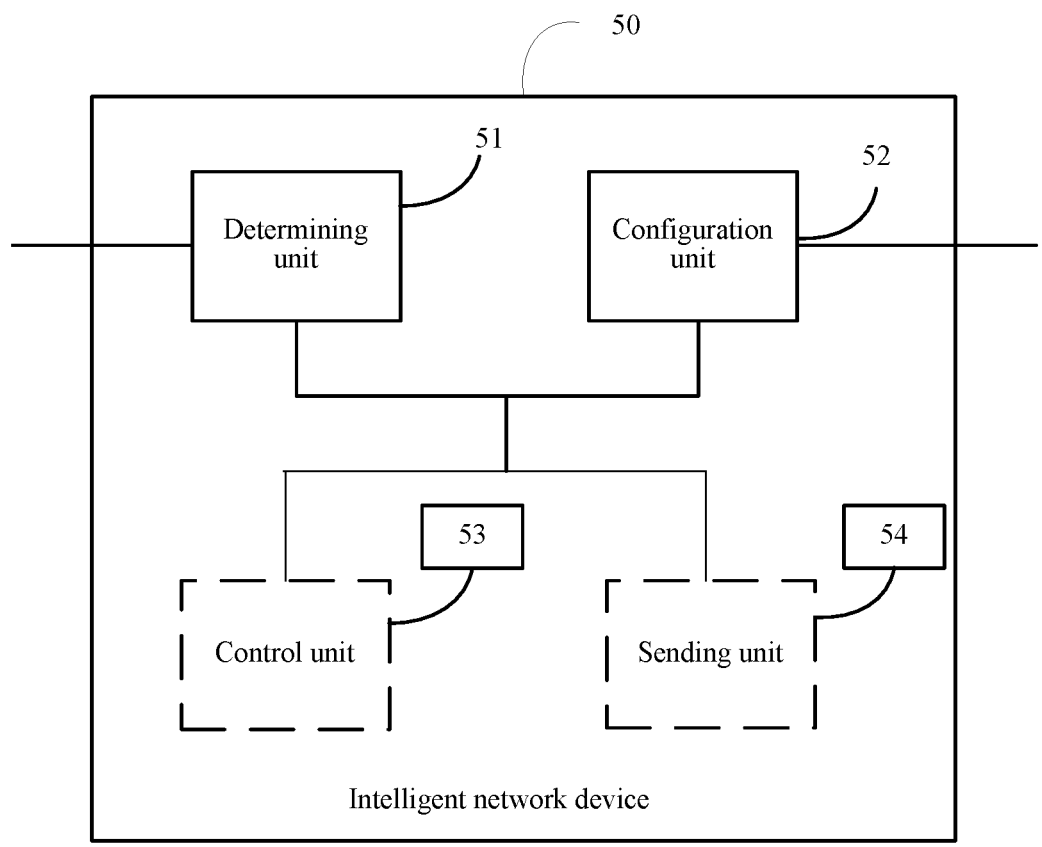
FIG. 5 is a schematic structural diagram of an intelligent network device according to this application.

Based on a same inventive idea, referring to FIG. 5, this application provides an intelligent network device 50, including a determining unit 51 and a configuration unit 52.

The determining unit 51 is configured to determine that a first PHY receives a first auto-negotiation configuration stream sent by a first network device connected to the first PHY, where the first auto-negotiation configuration stream is used to indicate that a negotiation mode of the first network device sending the first auto-negotiation configuration stream is an auto-negotiation mode.

The configuration unit 52 is configured to change a negotiation mode of a second PHY from a non-auto-negotiation mode to the auto-negotiation mode according to the first auto-negotiation configuration stream that is determined by the determining unit 51 and that is received by the first PHY.

The determining unit 51 is further configured to send a second auto-negotiation configuration stream to a second network device connected to the second PHY after the negotiation mode of the second PHY is changed to the auto-negotiation mode, and receive a third auto-negotiation configuration stream fed back by the second network device.

The configuration unit 52 is further configured to change a negotiation mode of the first PHY from the non-auto-negotiation mode to the auto-negotiation mode after the determining unit 51 determines that the third auto-negotiation configuration stream fed back by the second network device is received.

The first PHY and the second PHY are located in the intelligent network device 50.

Optionally, the intelligent network device 50 is plug-connected to the first network device to implement connection between the first PHY and the first network device.

The intelligent network device 50 is connected to the second network device in a remote communications connection manner to implement connection between the second PHY and the second network device.

Optionally, the intelligent network device 50 is plug-connected to the first network device to implement connection between the first PHY and the first network device.

The intelligent network device 50 is connected to the second network device using another intelligent network device to implement connection between the second PHY and the second network device.

When sending, after the negotiation mode of the second PHY is changed to the auto-negotiation mode, the second auto-negotiation configuration stream to the second network device connected to the second PHY, and receiving the third auto-negotiation configuration stream fed back by the second network device, the determining unit 51 is further configured to send, using the other intelligent network device, the second auto-negotiation configuration stream to the second network device connected to the second PHY after the negotiation mode of the second PHY is changed to the auto-negotiation mode, and receive the third auto-negotiation configuration stream that is fed back by the second network device using the other intelligent network device.

Sending, by the intelligent network device 50, the second auto-negotiation configuration stream to the second network device using the other intelligent network device includes sending, by the intelligent network device 50, a fourth auto-negotiation configuration stream to a third PHY in the other intelligent network device, and sending a fifth auto-negotiation configuration stream to the second network device using the fourth PHY after the other intelligent network device changes a negotiation mode of a fourth PHY in the other intelligent network device to the auto-negotiation mode.

Receiving, by the intelligent network device 50 using the other intelligent network device, the third auto-negotiation configuration stream fed back by the second network device includes receiving, by the intelligent network device 50, a sixth auto-negotiation configuration stream fed back by the third PHY in the other intelligent network device, where the sixth auto-negotiation configuration stream is fed back by the third PHY to the intelligent network device 50 after the other intelligent network device receives, at the fourth PHY, a seventh auto-negotiation configuration stream fed back by the second network device, and changes a negotiation mode of the third PHY to the auto-negotiation mode.

The intelligent network device 50 further includes a control unit 53 configured to control the second PHY to send an abnormal stream to the second network device when the determining unit 51 determines that a fault occurs between the first PHY and the first network device, where the abnormal stream is used to indicate that the fault occurs between the first PHY and the first network device.

The intelligent network device 50 further includes a sending unit 54 configured to send an eighth auto-negotiation configuration stream to the first network device after the configuration unit 52 changes the negotiation mode of the first PHY from the non-auto-negotiation mode to the auto-negotiation mode.

Figure 6:
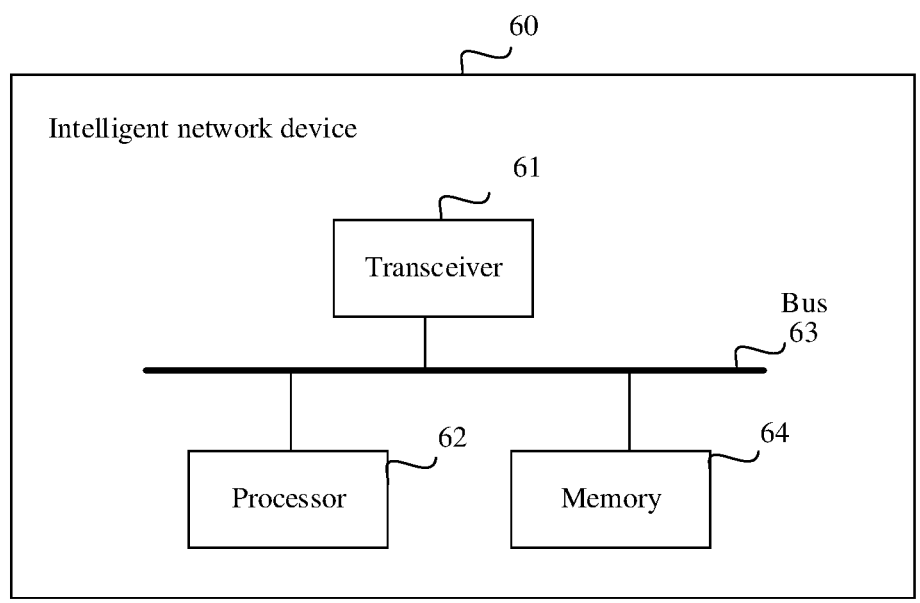
FIG. 6 is another schematic structural diagram of an intelligent network device according to this application.

Based on a same inventive idea, referring to FIG. 6, this application further provides an intelligent network device 60, including a transceiver 61, processor 62, and a bus 63. The transceiver 61 and the processor 62 are both connected to the bus 63. The processor 62 is configured to determine that a first PHY receives a first auto-negotiation configuration stream sent by a first network device connected to the first PHY, where the first auto-negotiation configuration stream is used to indicate that a negotiation mode of the first network device sending the first auto-negotiation configuration stream is an auto-negotiation mode, change a negotiation mode of a second PHY from a non-auto-negotiation mode to the auto-negotiation mode according to the first auto-negotiation configuration stream received by the first PHY, send a second auto-negotiation configuration stream to a second network device connected to the second PHY after the negotiation mode of the second PHY is changed to the auto-negotiation mode, and change a negotiation mode of the first PHY from the non-auto-negotiation mode to the auto-negotiation mode when receiving a third auto-negotiation configuration stream fed back by the second network device.

The first PHY and the second PHY are located in the intelligent network device 60.

Optionally, the intelligent network device 60 is plug-connected to the first network device to implement connection between the first PHY and the first network device.

The intelligent network device 60 is connected to the second network device in a remote communications connection manner to implement connection between the second PHY and the second network device.

Optionally, the intelligent network device 60 is plug-connected to the first network device, to implement connection between the first PHY and the first network device.

The intelligent network device 60 is connected to the second network device using another intelligent network device to implement connection between the second PHY and the second network device.

The processor 62 is further configured to send, using the other intelligent network device, the second auto-negotiation configuration stream to the second network device connected to the second PHY after the negotiation mode of the second PHY is changed to the auto-negotiation mode, and receive the third auto-negotiation configuration stream that is fed back by the second network device using the other intelligent network device.

When sending the second auto-negotiation configuration stream to the second network device using the other intelligent network device, the processor 62 is further configured to send a fourth auto-negotiation configuration stream to a third PHY in the other intelligent network device, and after the other intelligent network device changes a negotiation mode of a fourth PHY in the other intelligent network device to the auto-negotiation mode, send a fifth auto-negotiation configuration stream to the second network device using the fourth PHY.

When receiving, using the other intelligent network device, the third auto-negotiation configuration stream fed back by the second network device, the processor 62 is further configured to receive a sixth auto-negotiation configuration stream fed back by the third PHY in the other intelligent network device, where the sixth auto-negotiation configuration stream is fed back by the third PHY to the intelligent network device 60 after the other intelligent network device receives, at the fourth PHY, a seventh auto-negotiation configuration stream fed back by the second network device, and changes a negotiation mode of the third PHY to the auto-negotiation mode.

The processor 62 is further configured to control the second PHY to send an abnormal stream to the second network device when a fault occurs between the first PHY and the first network device, where the abnormal stream is used to indicate that the fault occurs between the first PHY and the first network device.

The intelligent network device 60 further includes a memory 64 configured to store a program invoked by the processor 62.

The processor 62 is further configured to send an eighth auto-negotiation configuration stream to the first network device after changing the negotiation mode of the first PHY from the non-auto-negotiation mode to the auto-negotiation mode.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact disc read-only memory (CD-ROM), an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of the present application have been described, a person skilled in the art can make changes and modifications to these embodiments once they learn the basic inventive concept. Therefore, the following claims are intended to be construed as to cover the embodiments and all changes and modifications falling within the scope of the present application.

Obviously, a person skilled in the art can make various modifications and variations to the embodiments of the present application without departing from the spirit and scope of the embodiments of the present application. The present application is intended to cover these modifications and variations provided that they fall within the scope of protection defined by the following claims and their equivalent technologies.

What is claimed is:

1. A negotiation mode processing method, comprising:
receiving, by an intelligent network device via a first physical layer (PHY), a first auto-negotiation configuration stream from a first network device coupled to the first PHY, wherein the intelligent network device comprises the first PHY and a second PHY coupled to a second network device, and wherein the first auto-negotiation configuration stream indicates that a negotiation mode of the first network device comprises an auto-negotiation mode;
changing, by the intelligent network device, a negotiation mode of the second PHY from a non-auto-negotiation mode to the auto-negotiation mode according to the first auto-negotiation configuration stream received via the first PHY;
sending, by the intelligent network device using another intelligent network device, a second auto-negotiation configuration stream to the second network device after the negotiation mode of the second PHY is changed to the auto-negotiation mode;
receiving, by the intelligent network device using the other intelligent network device, a third auto-negotiation configuration stream from the second network device; and
changing, by the intelligent network device, a negotiation mode of the first PHY from the non-auto-negotiation mode to the auto-negotiation mode after receiving the third auto-negotiation configuration stream from the second network device.

2. The method of claim 1, wherein the intelligent network device is plugged into the first network device, and wherein the intelligent network device is coupled to the second network device in a remote communications coupling manner.

3. The method of claim 1, wherein the intelligent network device is plugged into the first network device, and wherein the intelligent network device is coupled to the second network device using the other intelligent network device.

4. The method of claim 1, wherein sending the second auto-negotiation configuration stream to the second network device comprises:
sending, by the intelligent network device, a fourth auto-negotiation configuration stream to a third PHY in the other intelligent network device; and
sending, by the intelligent network device, a fifth auto-negotiation configuration stream to the second network device using a fourth PHY in the other intelligent network device after a negotiation mode of the fourth PHY is changed to the auto-negotiation mode,
wherein receiving the third auto-negotiation configuration stream from the second network device comprises receiving, by the intelligent network device, a sixth auto-negotiation configuration stream from the third PHY after a negotiation mode of the third PHY is changed to the auto-negotiation mode.

5. The method of claim 1, further comprising sending, by the second PHY, an abnormal stream to the second network device after a fault occurs between the first PHY and the first network device, wherein the abnormal stream indicates that the fault occurs between the first PHY and the first network device.

6. The method of claim 1, wherein after changing the negotiation mode of the first PHY from the non-auto-negotiation mode to the auto-negotiation mode, the method further comprises sending, by the intelligent network device, an eighth auto-negotiation configuration stream to the first network device.

7. An intelligent network device, comprising:
a non-transitory memory storing instructions; and
a processor coupled to the non-transitory memory, wherein the instructions cause the processor to be configured to:
receive, via a first physical layer (PHY) in the intelligent network device, a first auto-negotiation configuration stream from a first network device coupled to the first PHY, wherein the first auto-negotiation configuration stream indicates that a negotiation mode of the first network device comprises an auto-negotiation mode;
change a negotiation mode of a second PHY in the intelligent network device from a non-auto-negotiation mode to the auto-negotiation mode according to the first auto-negotiation configuration stream received by the first PHY;
send, using another intelligent network device, a second auto-negotiation configuration stream to a second network device coupled to the second PHY after the negotiation mode of the second PHY is changed to the auto-negotiation mode;

receive, using the other intelligent network device, a third auto-negotiation configuration stream from the second network device; and change a negotiation mode of the first PHY from the non-auto-negotiation mode to the auto-negotiation mode after receiving the third auto-negotiation configuration stream from the second network device.

8. The intelligent network device of claim 7, wherein the intelligent network device is plugged into the first network device, and wherein the intelligent network device is coupled to the second network device in a remote communications coupling manner.

9. The intelligent network device of claim 7, wherein the intelligent network device is plugged into the first network device, and wherein the intelligent network device is coupled to the second network device using the other intelligent network.

10. The intelligent network device of claim 9, wherein the instructions further cause the processor to be configured to:
send a fourth auto-negotiation configuration stream to a third PHY in the other intelligent network device;
send a fifth auto-negotiation configuration stream to the second network device using a fourth PHY in the other intelligent network device after a negotiation mode of the fourth PHY is changed to the auto-negotiation mode; and
receive a sixth auto-negotiation configuration stream from the third PHY after a negotiation mode of the third PHY is changed to the auto-negotiation mode.

11. The intelligent network device of claim 7, wherein the instructions further cause the processor to be configured to control the second PHY to send an abnormal stream to the second network device after the processor determines that a fault occurs between the first PHY and the first network device, and wherein the abnormal stream indicates that the fault occurs between the first PHY and the first network device.

12. The intelligent network device of claim 7, wherein the instructions further cause the processor to be configured to send an eighth auto-negotiation configuration stream to the first network device after the processor changes the negotiation mode of the first PHY from the non-auto-negotiation mode to the auto-negotiation mode.

13. An intelligent network device, comprising:
a bus;
a transceiver coupled to the bus; and
a processor coupled to the transceiver via the bus, wherein the processor is configured to:
receive, via a first physical layer (PHY) in the intelligent network device, a first auto-negotiation configuration stream from a first network device coupled to the first PHY, wherein the first auto-negotiation configuration stream indicates that a negotiation m ode of the first network device comprises an auto-negotiation mode;
change a negotiation mode of a second PHY in the intelligent network device from a non-auto-negotiation mode to the auto-negotiation mode according to the first auto-negotiation configuration stream received by the first PHY;
send, using another intelligent network device, a second auto-negotiation configuration stream to a second network device coupled to the second PHY after the negotiation mode of the second PHY is changed to the auto-negotiation mode;
receive, using the other intelligent network device, a third auto-negotiation configuration stream from the second network device; and
change a negotiation mode of the first PHY from the non-auto-negotiation mode to the auto-negotiation mode after receiving the third auto-negotiation configuration stream from the second network device.

14. The intelligent network device of claim 13, wherein the intelligent network device is plugged into the first network device, and wherein the intelligent network device is coupled to the second network device in a remote communications coupling manner.

15. The intelligent network device of claim 13, wherein the intelligent network device is plugged into the first network device, and wherein the intelligent network device is coupled to the second network device using the other intelligent network device.

16. The intelligent network device of claim 15, wherein when sending the second auto-negotiation configuration stream to the second network device using the other intelligent network device, the processor is further configured to:
send a fourth auto-negotiation configuration stream to a third PHY in the other intelligent network device; and
send a fifth auto-negotiation configuration stream to the second network device using a fourth PHY in the other intelligent network device after a negotiation mode of the fourth PHY is changed to the auto-negotiation mode,
wherein when receiving the third auto-negotiation configuration stream from the second network device, the processor is further configured to receive a sixth auto-negotiation configuration stream from the third PHY ater a negotiation mode of the third PHY is changed to the auto-negotiation mode.

17. The intelligent network device of claim 13, wherein the processor is further configured to control the second PHY to send an abnormal stream to the second network device after a fault occurs between the first PHY and the first network device, wherein the abnormal stream indicates that the fault occurs between the first PHY and the first network device.

18. The intelligent network device of claim 13, further comprising a memory configured to store a program to be invoked by the processor.

19. The intelligent network device of claim 13, wherein the processor is further configured to send an eighth auto-negotiation configuration stream to the first network device after changing the negotiation mode of the first PHY from the non-auto-negotiation mode to the auto-negotiation mode.

* * * * *

UNITED STATES PATENT AND TRADEMARK OFFICE
CERTIFICATE OF CORRECTION

PATENT NO. : 10,659,297 B2  
APPLICATION NO. : 15/940416  
DATED : May 19, 2020  
INVENTOR(S) : Fei Liu et al.

Page 1 of 1

It is certified that error appears in the above-identified patent and that said Letters Patent is hereby corrected as shown below:

On the Title Page

Page 2, Item (56), References Cited, Other Publications: "Section Two, IEEE Std 8023" should read "Section Two, IEEE Std 802.3"

Page 2, Item (56), References Cited, Other Publications: "Section Three, IEEE Std 8023" should read "Section Three, IEEE Std 802.3"

Page 2, Item (56), References Cited, Other Publications: "Section Five, IEEE Std 8023" should read "Section Five, IEEE Std 802.3"

In the Claims

Claim 13, Column 19, Line 55 and Line 56: "negotiation m ode of the" should read "negotiation mode of the"

Claim 16, Column 20, Line 41: "ater a negotiation mode" should read "after a negotiation mode"

Signed and Sealed this  
Seventh Day of July, 2020

Andrei Iancu  
*Director of the United States Patent and Trademark Office*